Patented Jan. 25, 1944

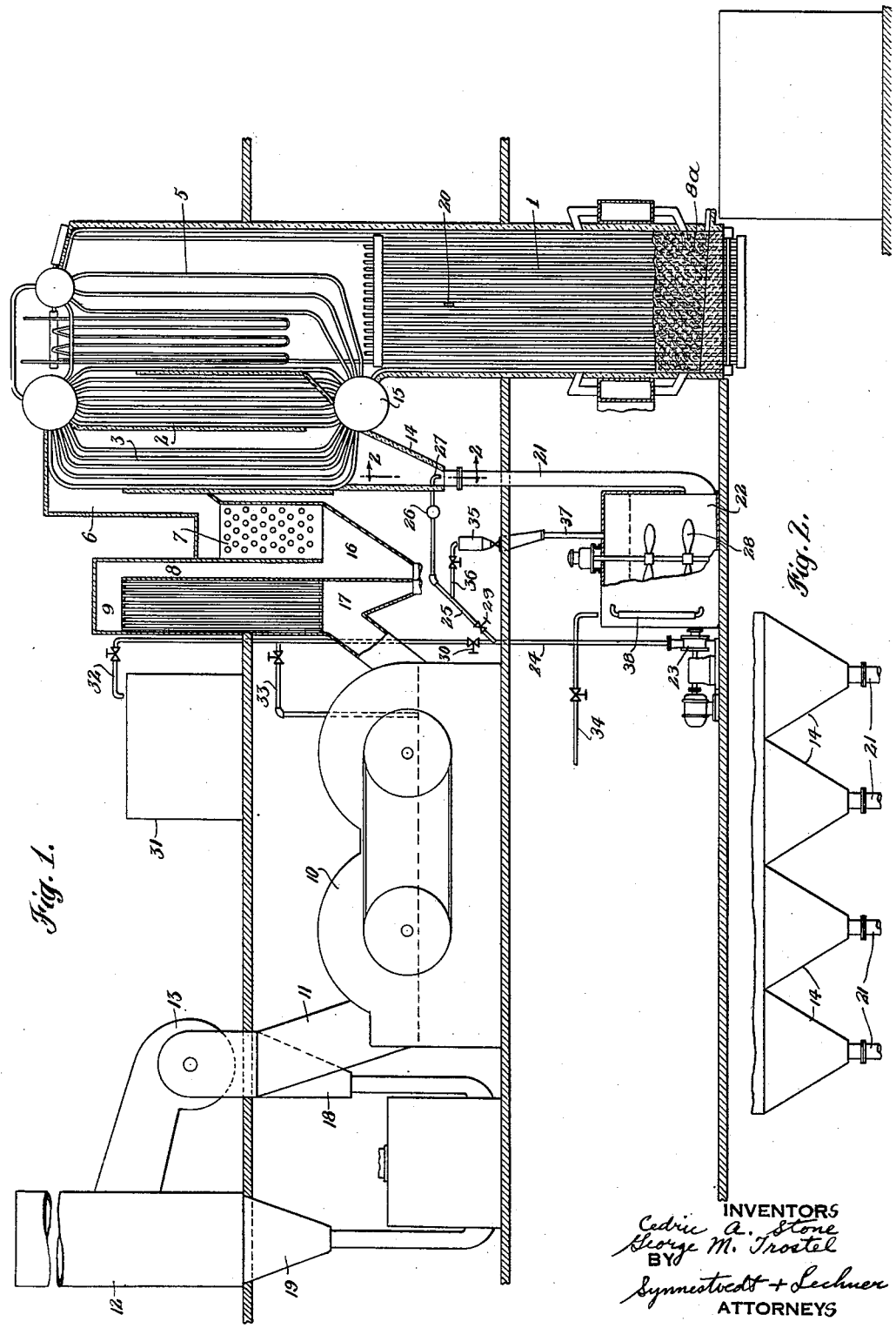

2,340,154

UNITED STATES PATENT OFFICE 2,340,154

RECOVERY OF CHEMICAL FROM THE WASTE HEAT BOILER SYSTEM OF CHEMICAL RECOVERY UNITS

Cedric Andrew Stone and George Michael Trostel, Canton, N. C., assignors to Combustion Engineering Company, Inc., New York, N. Y., a corporation of Delaware Application October 30, 1940, Serial No. 363,476

10 Claims. (Cl. 23—262)

This invention relates to the recovery of chemical from the chemical dust which settles out in the waste heat boiler system of a unit for recovering chemical and deriving heat from the black liquor of wood pulp mills, and its nature, objects and advantages will appear from the following.

The black or sulphide liquor from such mills contains carbonaceous material as well as chemical. To recover this chemical and to derive heat from the carbonaceous material, it is customary to provide a recovery unit which consists essentially of a smelter and a waste heat boiler and its appurtenances. The black liquor, evaporated to a desired density, is delivered to this unit and is dried therein, the dried solid matter falling to the bottom of the smelting zone, where a reducing atmosphere is maintained. There reduction takes place and the chemical, in the molten state, runs out. An oxidizing atmosphere is maintained above the smelting zone, in consequence of which the combustibles in the gases rising from the smelting zone are burned. The heat derived from the process which otherwise would be wasted, is recovered in the generation of steam. Ordinarily, these systems are self-sustaining, i. e., once started in operation, no external fuel is supplied.

As heat is absorbed by the waste heat boiler unit, vaporized chemical is condensed. Much of it separates and settles out of the gas stream in the form of powder or dust, as, for example, at the bottom of the boiler, economizer and air preheater passes, precipitators, cyclone separators, and the like. The remainder in part passes out the stack and in part deposits on the surfaces of the boiler and is removed therefrom by soot blowers or hand lances. The deposited particles, on removal from the surfaces, likewise separate out of the gas stream and settle in such places as those above indicated. The dust consists largely of sodium sulphate and sodium carbonate.

The removal and handling of this dust and the recovery of chemical therefrom present great difficulty in such systems. The dust is fine and very light per unit of volume.

Heretofore it has been the practice to drain the accumulations of dust, at regular intervals, through gates or valves to the floor, wheelbarrows or other conveying means being utilized for the delivery of the dust into the smelting furnace for re-processing. The volume to be handled is large, the mounds on the floor are unsightly, and besides which, the chemical being in the form of a fine dust, pollutes the atmosphere and covers all parts. Moreover, as the dust is passed into the furnace much of it rises directly with the gas stream and, by not reaching the smelting hearth, produces a re-circulation through the boiler, further increasing the quantity which must be handled. The recovery is low, particularly in relation to the labor and expense involved.

It has also been proposed to dump the dust into the evaporators or the black liquor storage tanks. This has most of the disadvantages above described and has the further disadvantage that it upsets operating conditions. Since the systems are self-sustaining, and are operated at a fairly uniform rate, it is apparent that, to obtain results, it is necessary to maintain close correlation of operating factors, such as the density of the black liquor delivered to the unit, the amount of air to the reducing or smelting zone, the amount of air to the combustion space, etc., etc. Change in the density of the liquor, which would follow from at times dumping large quantities of the chemical powder into the evaporator, upsets the operating balance of the system.

The primary object of our invention is to overcome difficulties such as the foregoing and to obtain a maximum recovery at a minimum of cost in a simple manner and with simple means.

A preferred form of apparatus for carrying out our invention is illustrated in the accompanying drawing, wherein—

Figure 1 is a diagrammatical illustration of a recovery system, shown partly in side elevation and partly in section, and Figure 2 is a section taken on the line 2—2 of Figure 1.

Referring to Figure 1, the reference numeral 1 denotes a furnace in the bottom of which is a smelting zone 8a. This furnace is lined with exposed tubular water walls forming a part of the waste boiler and is of considerable height. Above and to one side of the furnace is the boiler proper. It has upright banks of tubes 2 and 3, baffled so that the gas stream from the boiler-furnace chamber passes into the upper portion of the first pass and thence downwardly over the first bank of tubes and then into the lower portion of the second pass and upwardly over the second bank of tubes. Immediately in advance of the first pass of tubes, is a superheater 4 shielded by rows of boiler tubes 5. To the rear of the second bank of tubes is a down-pass 6 in which the economizer 7 is located. The down-pass communicates at its bottom with the lower portion of an up-pass 8 which communicates at its upper end with a down-pass 9, in which an air preheater is located. The waste gases after passing over the air preheater enter the evaporator 10 and eventually discharge into the duct 11 leading to the stack 12. The duct 11 has an induced draft fan 13. Hoppers 14 are located immediately to the rear and below the mud drum 15 and communicate with the lower portion of the first and second passes of the boiler. Similar hoppers 16, 17, 18 and 19 are respectively located at the bottom of the passes 6 and 8, the pass 9, and below the fan 13 and the stack 12.

The black liquor from the mill is led to the evaporators 10 where it is reduced to the desired density, usually from about 65% to 70% solids. The dense liquor, by means not shown, is led to the spray nozzles 20 and sprayed into the furnace chamber where the spray encounters the ascending flame stream. The particles in gravitating to the hearth are dried and collect on the hearth in the form of a bed. Air is admitted through the bed in an amount sufficient to maintain a reducing atmosphere. Reduction of the chemical takes place and it runs in molten form from off the hearth. The solid carbonaceous matter in the dried particles is burned. The combustibles in the gases rising from the bed encounter an oxidizing atmosphere and are burned. For this purpose additional air is admitted above the bed.

Chemical is, of course, present in the rising flame and gas stream in the form of vapor. This vapor is condensed by the absorption of heat by the steam generating and other surfaces of the boiler unit of the installation. It condenses largely in the form of the dust hereinbefore described, and due to the reversal of direction of the waste gas stream, from pass to pass, the dust separates out and settles in the hoppers 14, 16, and 17. Some dust also settles out in the hoppers 18 and 19. Such particles as deposit on the boiler tubes and other parts are, from time to time, removed therefrom by soot blowers or lances and also separate and settle out.

Referring now to the hoppers 14, it will be seen that a conduit or down spout 21 leads from each hopper to a tank 22 which contains water, weak wash liquor from the pulp mill or other suitable solvent, the spouts communicating with the tank near the bottom, well below the normal liquid level therein so that the liquid seals the spouts, preventing air from being drawn upwardly into the hoppers by the action of the induced draft fan. Entrance of air would interfere with the settling out of the dust particles.

In order to remove dust from the hoppers as it settles out and collects therein, solvent is pumped from the tank 22 by means of the pump 23 through pipe 24 and pipe 25, manifold 26, and spray nozzles 27 which lead from the manifold and discharge into the lower portions of the hoppers. The discharged solvent returns to the tank. By reason of this circulation of the solvent, the dust is removed substantially as rapidly as it collects in the hoppers. This is of advantage in that it prevents any great accumulation of dust which, if permitted, might result in the periodic discharge of large gobs of dust which might cause explosions and fires. (In this connection it is to be borne in mind that there is sodium present.) To the same end and for the same reasons, it is desirable to have the down spouts 21 substantially upright or at least sufficiently so, to prevent "hang-ups," to have the diameter of the spouts approximately equal to that of the discharge mouths of the hoppers, and to bend the lower ends of the spouts on a large radius.

The chemical entering the tank is dissolved, to facilitate which agitators 28 are provided. When the solution in the tank is sufficiently highly concentrated in chemical, the valve 29 controlling the pipe 25 is closed and the valve 30 in pipe 24 is opened, whereby a portion of the solution may be pumped from the tank to some suitable place for reintroduction into the system, as, for example, into the storage tank 31, or into the evaporators 10 by means of the pipes 32 and 33, respectively. These pipes are each valve-controlled. Make-up solvent is added to the tank as required, by the valve controlled pipe 34, leading from a suitable source of supply.

To facilitate the operation, a sampling chamber 35 may be provided. This is connected to pipe 25 by means of a valve controlled pipe 36. To obtain a sample, the valve in such pipe is opened and a quantity of the solution enters the sampling chamber 35 for a hydrometer reading, after which the contents are returned to the storage tank by the pipe 37.

To facilitate the substantially constant delivery of the dust from the hoppers to the tank, the capacity of the pump is such that solvent is delivered from the spray nozzles 27 under some pressure. The tank may be provided with a liquid level gauge 38.

It is to be understood that the hoppers 16 and 17 are similarly equipped, although in many instances the hoppers 14, 16 and 17 may be served by the same dissolving and circulating unit. It is likewise to be understood that a similar unit or units may serve the hoppers 18 and 19.

It will be seen from the foregoing that we have provided a very simple and effective method and apparatus for handling the chemical dust from such installations. There is no nuisance, but little attention is required, and a maximum quantity of the dust may be effectively returned for recovery in the smelting zone. If all of the hoppers are equipped, it will be seen that the entire system is closed insofar as dust is concerned, except for the stack. It will also be observed that the solvent is employed as a means for ensuring the substantially continuous removal of the dust from the hoppers. While it is desirable to operate the dust recovery system on the batch principle, it is possible, under some conditions, and for some periods of time, to maintain both valves 29 and 30 open so as to divide the pump discharge. By dissolving the dust and delivering the concentrated solution to the storage tank or to the evaporators, it is possible to effect return of the chemical into the system for reprocessing without substantially upsetting the operating balance of the system.

We claim:

1. In a system for recovering chemical and deriving heat from the black liquor of pulp mills, which system has a container adapted to hold a supply of black liquor, a smelter and a waste heat boiler unit, said boiler unit having one or more regions for the collection of chemical dust formed by the condensation of vaporized chemicals through absorption of heat, the combination of a tank adapted to contain a body of solvent, a conduit connecting the region for dust collection with said tank for conducting dust to said tank for dissolving in the body of solvent therein, another conduit for conducting solvent from said tank to said dust conduit, and pump means for circulating the solvent in said conduits whereby there is a circulation of solvent from said tank to said dust conduit back to the tank, and a conduit for delivering the solution in said tank to the said container for reprocessing in the system to recover chemical therefrom.

2. In a system for recovering chemical and deriving heat from the black liquor of pulp mills, which system has a smelter, an evaporator for the black liquor and a waste heat boiler unit, said boiler unit having one or more regions for the collection of chemical dust formed by the condensation of vaporized chemicals through the absorption of heat, the combination of a tank adapted to contain a body of solvent, a conduit connecting the region for dust collection with said tank for conducting dust to said tank for dissolving in the body of solvent therein, another conduit for conducting solvent from said tank to said dust conduit, and pump means for circulating the solvent in said conduits whereby there is a circulation of solvent from said tank to said dust conduit back to the tank, and a conduit for delivering the solution in said tank to the evaporator for reprocessing in the system to recover chemical therefrom.

3. In a system for recovering chemical and deriving heat from the black liquor of pulp mills, which system has a container adapted to hold a supply of black liquor to be processed, a smelter and a waste heat boiler unit, said boiler unit having one or more regions for the collection of chemical dust formed by the condensation of vaporized chemicals through the absorption of heat, the combination of a tank adapted to contain a body of solvent, a conduit connecting the region for dust collection with said tank for conducting dust to said tank for dissolving in the body of solvent therein, another conduit for conducting solvent from said tank to said dust conduit, and pump means for circulating the solvent in said conduits whereby there is a circulation of solvent from said tank through said dust conduit back to the tank, and a connection for delivering solution formed by the dissolving of dust to the black liquor container for reprocessing in the system to recover chemical therefrom.

4. In a system for recovering chemical and deriving heat from the black liquor of pulp mills, which system has a container adapted to hold a supply of black liquor to be processed, a smelter and a waste heat boiler unit, said boiler unit having one or more hoppers for the collection of chemical dust formed by the condensation of vaporized chemicals through the absorption of heat, the combination of a tank adapted to contain a body of solvent, a connection leading from the hopper to the tank, a connection leading from the tank to the hopper, a pump for circulating solvent through said latter connection to the hopper and thence back to the tank, and a connection for delivering solution formed by the dissolving of dust to the black liquor container for reprocessing in the system.

5. In a system for recovering chemical and deriving heat from the black liquor of pulp mills, which system has a container adapted to hold a supply of black liquor to be processed, a smelter and a waste heat boiler unit, said boiler unit having one or more hoppers for the collection of chemical dust formed by the condensation of vaporized chemicals through the absorption of heat, the combination of a tank adapted to contain a body of solvent, a connection leading from the hopper to the tank, a connection leading from the tank to the hopper, a pump for circulating solvent through said latter connection to the hopper and thence back to the tank, and a connection for delivering solution formed by the dissolving of dust to the black liquor container for reprocessing in the system, the connection leading from the hopper to the tank being substantially upright.

6. In a system for recovering chemical and deriving heat from the black liquor of pulp mills, which system has a container adapted to hold a supply of black liquor to be processed, a smelter and a waste heat boiler unit, said boiler unit having one or more hoppers for the collection of chemical dust formed by the condensation of vaporized chemicals through the absorption of heat, the combination of a tank adapted to contain a body of solvent, a connection leading from the hopper to the tank, a connection leading from the tank to the hopper, a pump for circulating solvent through said latter connection to the hopper and thence back to the tank, and a connection for delivering solution formed by the dissolving of dust to the black liquor container for reprocessing in the system, the connection leading from the hopper to the tank communicating with the tank at a point below the normal liquid level therein.

7. In a system for recovering chemical and deriving heat from the black liquor of pulp mills, which system has a container adapted to hold a supply of black liquor to be processed, a smelter and a waste heat boiler unit, said boiler unit having one or more hoppers for the collection of chemical dust formed by the condensation of vaporized chemicals through the absorption of heat, the combination of a tank adapted to contain a body of solvent, a connection leading from the hopper to the tank, a connection leading from the tank to the hopper, a pump for circulating solvent through said latter connection to the hopper and thence back to the tank, and a connection for delivering solution formed by the dissolving of dust to the black liquor container for reprocessing in the system, the connection leading from the hopper to the tank being substantially upright and having a cross sectional area approximately the same as that of the discharge mouth of the hopper.

8. In a system for recovering chemical and deriving heat from the black liquor of pulp mills, which system has a container adapted to hold a supply of black liquor to be processed, a smelter and a waste heat boiler unit, said boiler unit having one or more hoppers for the collection of chemical dust formed by the condensation of vaporized chemicals through the absorption of heat, the combination of a tank adapted to contain a body of solvent, a connection leading from the hopper to the tank, a valve controlled connection leading from the tank to the hopper, a pump for circulating solvent from the tank to the hopper and back to the tank, and a valve controlled pipe connected to the circulating system of the tank for removal of solution from the tank for introduction into the black liquor container.

9. In a system for recovering chemical and deriving heat from the black liquor of pulp mills, which system has a container adapted to hold a supply of black liquor to be processed, a smelter and a waste heat boiler unit, said boiler unit having one or more hoppers for the collection of chemical dust formed by the condensation of vaporized chemicals through the absorption of heat, the combination of a tank adapted to contain a body of solvent, a connection leading from the hopper to the tank, a valve controlled connection leading from the tank to the hopper, a pump for circulating solvent from the tank to the hopper and back to the tank, and a valve controlled pipe connected to the circulating system of the tank for removal of solution from the tank for introduction into the black liquor container, together with a sampling device connected to the circulating system of the tank.

10. In a system for recovering chemical and deriving heat from the black liquor of pulp mills, which system has a container adapted to hold a supply of black liquor to be processed, a smelter and a waste heat boiler unit, said boiler unit having a plurality of hoppers for collection of chemical dust separating out of the waste gas stream, the tank adapted to contain a body of solvent, conduit means for connecting each hopper to said tank below the liquid level thereof, conduit means for circulating solvent to each hopper and back to the tank through said first mentioned means, pump means for circulating the solvent through said conduits whereby the system is closed as to dust except for its stack, and conduit means for delivering solvent from said tank to the black liquor container.

CEDRIC ANDREW STONE.
GEORGE MICHAEL TROSTEL.